United States Patent Office.

C. EDWARDS LESTER, OF NEW YORK, N. Y.

Letters Patent No. 96,243, dated October 26, 1869.

IMPROVED FUEL FOR METALLURGIC PURPOSES.

The Schedule referred to in these Letters Patent and making part of the same.

*To all whom it may concern:*

Be it known that I, C. EDWARDS LESTER, of New York, in the county of New York, and State of New York, have invented certain new and useful Improvements in Fuel for Metallurgic and other Purposes; and I do hereby declare that the following is a full, clear, and exact description thereof.

Five years ago I commenced and have ever since prosecuted a series of investigations and experiments, whose object was to create or discover a fuel which should possess the following advantages over all others in use for general or specific metallurgic purposes:

First, of superlative heating-power.

Second, free from sulphurets, phosphates, and other substances noxious in and unfavorable to the production and manipulation of pure metal, particularly iron and steel.

Third, capable in its manufacture of being adapted to any specific purpose in any department of metallurgy.

Fourth, of readier ignition and greater compactness for storage, by containing within a given space a greater amount of calorific power.

Fifth, whose ingredients are found all over the world, in nearly all countries, and which have little or no commercial value, thus saving cost of material and of transportation.

Sixth, applicable to any apparatus now in use for any metallurgic purposes, whether in reducing ores, or melting or manipulating metals.

In accomplishing these purposes, I found it necessary to produce a proximately pure hydrocarbon in a solid form, from which should be evolved, in combustion, those gases which would secure the results so much demanded in the wide range of metallurgy.

I found carbon, as a simple element, whether in the form of coke or anthracite, (even if desulphurized,) or animal or vegetable charcoal, too feeble an agent, and generally too expensive and bulky. I therefore resorted to substances rich in hydrogen, which, united with carbon, and furnished with the requisite supply of oxygen, produce the intensest heat. Hence, in my solid hydrocarbon I imitate the heat of the compound blow-pipe, by combining hydrogenous and carbonaceous substances in such proportions as will, with a sufficient draught, produce a perfect or nearly perfect combustion. Such a combination enables the compound in combustion to receive and appropriate a much larger amount of oxygen from the air than any other solid fuel known.

Hydrogen has many times the heating power of carbon, owing chiefly, I believe, to its capacity to receive, and absorb, and chemically combine, in combustion, with a much greater amount of oxygen, the chief promoter of combustion. Hence the more fixed hydrogen any fuel contains, provided it is mixed in proper proportions with carbon and oxygen, thereby evolving carbonic-acid gas instead of carbonic oxide, the easier are its ignition and combustion, the greater the quantity of pure flame, and the intenser the heat.

Hydrogen as a pure gas being too difficult and expensive to generate, control, and apply with a proper draught, oxygen being obtainable in any desirable quantity from the atmosphere, I resort to the cheapest, most manageable, and universally-diffused materials in which hydrogen is found, in union with carbon chiefly, to obtain it.

Desirous of procuring only carbonaceous and hydrogenous substances in the purest practicable shape, I seek those materials which are richest in these qualities, freest from all other ingredients, most accessible, the easiest to manipulate, and the lowest in cost.

I. My first, and in all cases my largest ingredient, is peat, which constitutes the base of my fuel, and never less than fifty per cent. of the entire mass. I recommend the peat to be used in a crude state, taken from deep deposits after they have been thoroughly drained and free from surface-water, since I find that the liquor held in solution by such peat contains a large proportion of hydrogenous matter, which, if combined with my other materials before it has evaporated, remains permanently in my fuel, adding greatly to its flame, and of necessity to its calorific intensity. I thus save most of the volatile hydrogenous matter which escapes from peat when allowed to become much or thoroughly dried. I also find that as hydrogen has more affinity for carbon than for the atmosphere, the oxygen in the water contained in the crude peat is mostly expelled by the manipulation and pressure in manufacturing, and the rest escapes by subsequent drying in an ordinary atmosphere, whether sheltered or not. I select peat as rich as possible in carbonaceous and hydrogenous matter, particularly the latter, *e. g.*, bituminous peat, as very often found, especially in large or deep deposits, as in the Dismal Swamp, and asphaltic peat, as found abundantly on our Pacific coast, such peats showing, on analysis, from fifty to seventy-two per cent. of bitumen.

II. My next largest ingredients I choose from any of the following substances, the choice being determined by their freedom from useless or deleterious elements, their richness in carbonaceous and hydrogenous qualities, and their cost at the place of manufacture, viz: desulphurized, and, if necessary, dephosphorized mineral coal or its refuse, whether anthracite, bituminous, or semi-bituminous, or charcoal, or its refuse, brown or stone-coal, so called, or lignite, or marl, or limestone, whether the two latter be bituminous or not. Of these substances, I use about one-quarter. I mix with the coal the same quantity, by weight, of common salt as the amount, by weight, of sulphur and phosphorus, if any is found to be contained in it (the coal) after they are ground together, pass the compound into an upright stationary cylinder, of iron or any substantial material, through which a vertical shaft with numerous arms revolves, a constant supply of steam of high temperature is introduced through pipes or orifices at the bottom, and this steam escapes through fine orifices in the cover at the top. I am not particular about this exact form; I only want to have the mass of coal-dust and salt thoroughly acted upon by the steam. In a cylinder holding one thousand pounds, the length of the cylinder being six times greater than the diameter, twenty-five thousand revolutions of the shaft completes the process. The vapor of salt thus volatilized decomposes the obnoxious ingredients in the coal-dust, and the fuel evolves no sulphurous acid in combustion, and the heat generated by my fuel is powerful enough to destroy sulphur, phosphorus, and other hurtful ingredients in any ore or metal.

III. I also resort to other substances which are more particularly hydrogenous in their nature, viz, asphaltum, resin, pitch, petroleum, tar, or any mineral, vegetable, or animal oil, or oleaginous, fatty, or greasy materials, whether pure, mixed, or refuse, my object being more particularly to draw hydrogenous matter from those substances furnishing it most abundantly and economically. From these materials I draw from ten to thirty per cent. I cannot lay down the exact proportions of these different ingredients, because most of them vary so widely in the relative amounts of carbon and hydrogen as found in different forms, places, and conditions. When I have my materials on hand, I fix the rule of proportions by ascertaining, from analysis or experiments, or both, the amount of the elements I desire contained in each, and so regulate the quantity of each as to secure my object, viz, a solid hydrocarbon, which, with a sufficient and well-regulated draught, will produce complete combustion with great flame and superlative heating-power.

My Process of Treatment.

First, I equally and thoroughly mix the materials, by grinding them all together, or any of them separately first, if found best, so completely pulverizing and disintegrating them, that when mixed they constitute a homogeneous compound mass. I have done this satisfactorily with Bogardus's eccentric mill.

Second, this compound is then passed through a press, as dry clay brick are pressed, of sufficient power to shape it into any desired form, or of any degree of compactness and solidity required; or by an apparatus of my own invention, the two before-mentioned processes may be done with one machine.

I do not claim the mere combination of the within-mentioned substances; but

What I do claim, and desire to secure by Letters Patent, is—

1. Desulphurizing and dephosphorizing coal, or its refuse, when placed in union with any other substance or substances, for the purpose described.

2. The production of a solid hydrocarbon, substantially as herein set forth, that is to say, by the union of hydrogenous and carbonaceous substances, when said substances are treated chemically and mechanically, substantially in the manner and for the purposes described.

C. EDWARDS LESTER.

Witnesses:
 SMITH GARDNER,
 J. A. WEISSE.